United States Patent [19]

Frenk et al.

[11] 3,899,251

[45] Aug. 12, 1975

[54] APPARATUS AND METHOD FOR MEASURING THE RELATIVE DISTANCE AND OPTIONALLY THE RELATIVE VELOCITY OF AN OBJECT

[75] Inventors: Helmuth Frenk; Ludwig Leitz, both of Wetzlar, Germany

[73] Assignee: Ernst Leitz GmbH, Wetzlar, Germany

[22] Filed: Feb. 25, 1974

[21] Appl. No.: 445,808

[30] Foreign Application Priority Data
Feb. 26, 1973   Germany............................ 2309462

[52] U.S. Cl. .......................... 356/28; 356/4; 356/5; 343/9
[51] Int. Cl.²........................ G01C 3/08; G01P 3/36
[58] Field of Search ................... 356/4, 5, 28; 343/9

[56] References Cited
UNITED STATES PATENTS
3,689,157   9/1972   Andermo............................ 356/28
3,815,994   6/1974   Peckham............................. 356/4

*Primary Examiner*—Richard A. Farley
*Assistant Examiner*—S. C. Buczinski
*Attorney, Agent, or Firm*—Gilbert L. Wells

[57]  ABSTRACT

In an apparatus for measuring the relative distance and optionally the relative velocity of an object with respect to a reference system, the improvement comprising, using two optical correlator systems with differing distances from the object, forming an auxiliary signal by mixing the electric output signals of the correlator systems, wherein the auxiliary signal has the difference frequency of these output signals; and then counting the number of signal cycles of one of the correlator output signals obtained during the duration of a cycle of the auxiliary signal and indicating the number of signal cycles as a value proportional to the distance.

12 Claims, 5 Drawing Figures

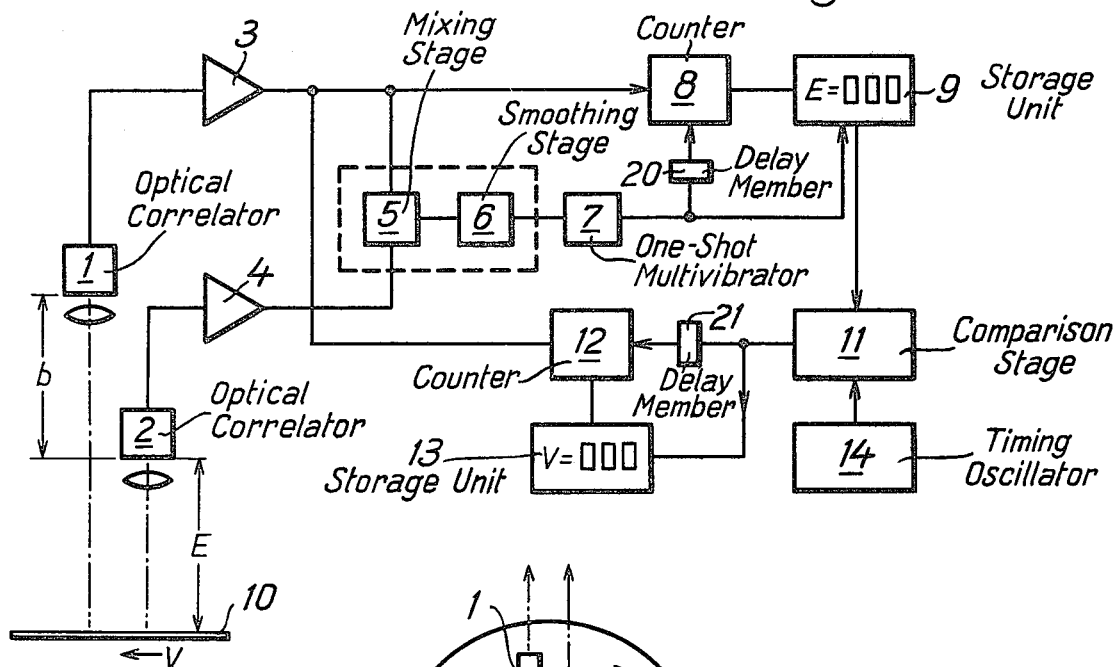
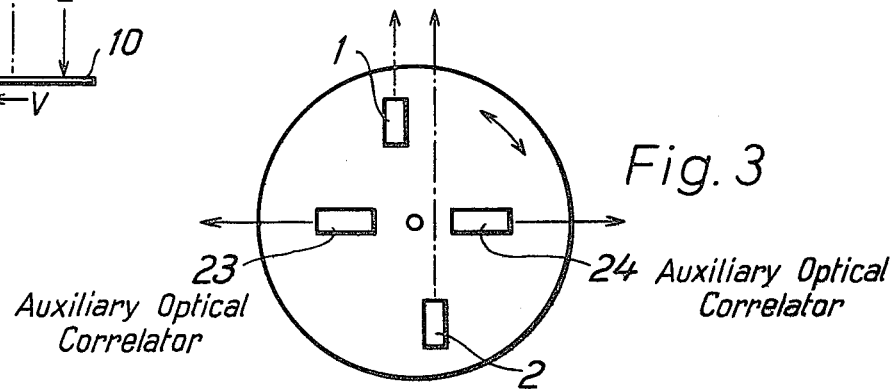
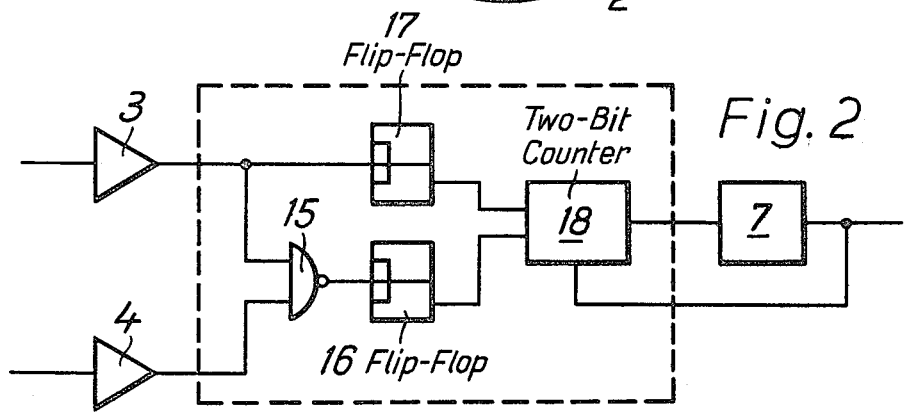

APPARATUS AND METHOD FOR MEASURING THE RELATIVE DISTANCE AND OPTIONALLY THE RELATIVE VELOCITY OF AN OBJECT

CROSS REFERENCES TO RELATED APPLICATIONS

Applicants claim priority under 35 U.S.C. 119 for Application Ser. No. P 23 09 462.4, filed Feb. 26, 1973, in the Patent Office of the Federal Republic of Germany.

The disclosure of U.S. applications Ser. No. 283,967, filed Aug. 28, 1972, of Heitmann et al. and now abandoned; Ser. No. 344,484, filed Mar. 26, 1973, of Heitmann et al.; and Ser. No. 376,418 of Ludwig Leitz and Knut Heitmann, filed July 5, 1973, are incorporated herein.

Application Ser. No. 283,967 discloses the state of the art of apparatus for no-contact measurement and particularly discloses the use of a pyramidal grating, the method for converting the position frequency into a speed proportional time frequency, how the magnitude and direction is determined from the grating movement, the electronic circuitry used, how the magnitude and/or velocity are obtained, and how the push-pull signals are evaluated.

The state of the art of systems for measuring, controlling, and/or indicating the movement of land vehicles with respect to surroundings is disclosed in application Ser. No. 344,484.

Application Ser. No. 376,418 discloses the state of the art of measuring the relative position and/or velocity of two objects with respect to each other and/or with respect to a common reference system using electro-optical measuring means.

BACKGROUND OF THE INVENTION

The present invention relates to a method and apparatus for measuring the relative distance and/or the relative velocity of an object with respect to a reference system using two optical correlators having differing distances to the object.

Methods for the no-contact measurement of the speed of objects without systematic measuring markers using optical correlators are conventional as disclosed in application Ser. No. 283,967. In these methods a structure of the object is imaged on a grid or grating. The modulated light fluxes produced at this grid are fed to correspondingly arranged photoelectric receivers, the output signals of which have a frequency component proportional to the angular speed of the object with reference to the imaging optical system. The measuring frequency can be separated from interference portions by the production of an additional signal comprising the frequency component of interest with phase opposition, and by the formation of the difference of these signals. Also, as disclosed heretofore, rotary field signals for a directional indication of the movement can be produced when this method is used with the use of additional structural components.

These methods permit only the measurement of anuglar velocities, from which the actual tracking velocity of the object to be measured is obtained, however, only upon a knowledge of the distance. Therefore, a measuring procedure has furthermore been set forth in application Ser. No. 376,418, wherein images of the object to be measured are produced in at least two different spatial positions. After the images are produced, a.c. signals of differing frequency proportional to the relative movements of these images to at least one optical correlation system are produced, and finally, these signals, with the use of trigonometric relationships of the perspective reproduction, are evaluated in a computer system with respect to the values to be determined. In this connection, when one of the three variables of: object distance, velocity or direction of velocity are known, the other two are, respectively calculated therefrom.

It is an object of the present invention to provide a very simple computer making it possible to determine an object automatically in a particularly simple and economical manner.

SUMMARY OF THE INVENTION

This object is attained with the use of a method for measuring one of the variables: relative distance, relative velociy, or traveling direction of an object with regard to a reference system, characterized in that an auxiliary signal is formed with the use of two optical correlators having different distances from the object, by mixing the electric output signals of the correlators. This auxiliary signal has the difference frequency of these output signals; and thereafter the number of signal cycles of one of the correlator output signals, obtained during the duration of a cycle of the auxiliary signal, is counted and indicated as a value proportional to the distance. A further embodiment of the process is distinguished in that additionally a second auxiliary signal is produced with a constant timed frequency dependent on the optical characteristic values of the correlators; that a third auxiliary signal is produced from this second auxiliary signal after a given number of cycles as indicated by the range indicator; and that thereafter the number of signal cycles of one of the correlator signals, obtained during the duration of a cycle of the third auxiliary signal, is counted and indicated as a value proportional to the velocity.

A method for the elimination of measuring errors due to self-rotation of the correlators relative to the reference system is distinguished in that the angular velocity of this self-rotation is determined with the use of two auxiliary correlators oriented at right angles to the optical axes of the measuring correlators and in opposition to each other. The frequency of the measuring correlator signals is corrected accordingly, depending upon auxiliary signals resulting from this determination.

An apparatus for conducting this method is characterized in that two optical correlators are provided, the photoelectric receivers of which are connected, via saturated amplifiers, with a mixing system. A one-shot multi-vibrator is connected after this mixing stage via a smoothing stage and furthermore one amplifier is associated, via a counter, with an indicator for the distance, coupled with a storage unit. In this storage unit, the one-shot multivibrator is connected to the input gate of the storage unit and, via a delay member, with the resetting input of the counter. A resistor network can be employed as the mixing stage. A further embodiment of this apparatus is distinguished in that a counting stage equipped with a counter controlled by an oscillator at a constant timing frequency is connected after the storage unit. One of the amplifiers of the apparatus is associated, via a further counter, with a second storage unit having an indicator for the speed indication coupled thereto, wherein the counting stage is connected to the input gate of the second storage unit and, via a delay stage, with the resetting input of the further counter.

An apparatus of this invention can also be constructed so that the outputs of the saturated amplifiers are connected to the inputs of an AND gate, instead of being connected to the resistor network with the smoothing stage joined thereto. A first flip-flop is connected after this gate, and a second flip-flop is connected after one of the amplifiers. The outputs of these flip-flops are connected to the forward counting input and the backward counting input, respectively, of a two-bit counter. The output of this counter is connected with the input of the one-shot multivibrator, the output signals of which are employed, on the one hand, as control signals for the counter and the storage unit, and on the other hand, as resetting signals for the two-bit counter.

Additional modifications of the methods and apparatus of the present invention are set forth in the drawings, disclosure and claims which follow.

BRIEF DESCRIPTION OF THE DRAWINGS

The invention is best described below with reference to embodiments shown schematically in the drawings, to wit:

FIG. 1 shows in a schematic plan view, an apparatus for measuring the distance and velocity of an object;

FIG. 2 shows in a schematic plan view, a modification of the mixing stage in the measuring apparatus of FIG. 1 for objects with very different velocities;

FIG. 3 shows in a schematic plan view, an apparatus for compensation of the inherent rotation of the measuring head;

DESCRIPTION OF THE PREFERRED EMBODIMENTS

Figure 4:
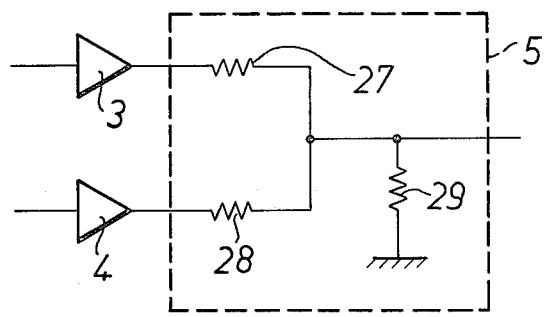
FIG. 4 shows in a schematic plan view, a detail of the mixing stage of FIG. 1 comprising a network of resistors.

FIG. 1 illustrates schematically two optical correlator systems 1 and 2 having the distances E and E+$b$ from an object 10 to be measured. Embodiments of these correlator systems are disclosed in application Ser. No. 283,967, filed Aug. 28, 1972. Each correlator is associated with a saturated amplifier 3 and 4, respectively, the outputs of which are connected to a mixing stage 5 which, in one embodiment, is constructed as a resistor network being composed of resistors 27, 28, 29 and which operates as an adding member as shown in FIG. 4. A one-shot multivibrator 7 is connected via a smoothing stage 6 and the output signals of this one-shot multivibrator are fed as control signals to a storage unit 9 having an indicator, as well as via a delay member 20 to the resetting input of the counter 8, activated by the output of one of the amplifiers.

The indicator shows the object distance. If only this value is desired, then the other groups of components shown in FIG. 1 can be omitted. For purposes of velocity measurement, a comparison stage 11 is provided which is fed by a timing oscillator 14, as well as from the storage unit 9. An additional counter 12 is connected after the amplifier 3, and the counter is associated with a storage unit 13 with an indicator coupled thereto for velocity indication. The comparison stage 11 controls, via a delay member 21, the counter 12, as well as the storage unit 13. Examples of the smoothing stage (6), delay members (20, 21), comparison stage (11), timing oscillator (14), counters (8, 12) and storage units (9, 13) include respectively an RC-network (6) as shown in: Lueger "Lexikon der Feinwerktechnik" Band 13, page 339, Deutsche Verlags-Anstalt, Stuttgart, 1968; RC-network in combinatiion with a pulse shaping trigger (2o, 21) as supplied by Texas-Instruments with designation SN 7413; a backward counter (11), Texas-Instruments SN 74193 preset from (9) giving a pulse at zero; oscillator (14) as described in RCA-Application book SSD 202 A, ICAN 5030; counters (8, 12), Texas-Instruments SN 7490 and storage units (9, 13), Texas-Instruments TIL 308.

When an object moving at a distance E with a velocity $v$ at right angles to the optical axis of a correlator system having the focal length f and the grating constant a is measured, the correlator system produces a signal having the frequency $$F_1 = \frac{f}{a} \cdot \frac{v}{E}$$

In order to measure the velocity v, the distance E must be known, and vice versa.

In combination with a second correlator system, both magnitudes can be measured and/or one of the magnitudes can be eliminated. If the second correlator system has the distance from the object:

$$E + b = E(1 + \beta),$$

then its signal frequency is:

$$F_2 = \frac{f}{a} \cdot \frac{v}{E(1+\beta)}$$

$\beta = (b/E)$ is small as compared to 1, as long as the measuring base b is small with respect to the distance E. Thus, there is the problem of economically eliminating the velocity v from the frequencies $F_1$ and $F_2$ of the two correlator systems, so that an indication of the distance E is directly obtained and there is optionally the further problem of employing this distance value for indicating the transverse velocity v independent of the distance.

This is accomplished, according to the invention, by forming a beat-note signal having the difference frequency $\Delta F$ by mixing the two correlator output signals, and by counting the oscillations of the signal having the frequency $F_1$ for the duration of one beat period ($1/\Delta F$) and indicating same as the distance.

The difference of the two correlator frequencies $F_1$ and $F_2$, due to $\beta \ll 1$, is:

$$\Delta F = \frac{vf}{a}\left[\frac{1}{E} - \frac{1}{E+b}\right] \approx \frac{vf}{a} \cdot \frac{\beta}{E}$$

and $$\frac{F_1}{\Delta F} = \frac{1}{\beta} = \frac{E}{b}.$$

in other words, the ratio ($F_1/\Delta F$) is equal to the distance E expressed in base lengths $b$. For example, if $b$ = 1 m, then E is obtained in meters. Thus, by the division ($F_1/\Delta F$), the apparatus constants $a, f$ as well as the speed $v$ are eliminated.

It is also possible to select the measuring base $b$, for example, to be one-half, one-quarter, or twice as large as the length unit. The indication in this case is adapted electro-digitally.

The two correlator output signals, which are converted by the saturated amplifiers 3 and 4 into rectangular voltages of identical amplitude, are mixed in the summing stage 5, the output signals of which are freed of the frequencies $F_1$, $F_2$ and smoothed in the smoothing stage 6. In the one-shot multivibrator 7 connected thereafter, a pulse is produced per beat cycle of the output signals, for example each time the amplitude passes through zero.

While the rectangular signal of the frequency $F_2$ is fed to the counter input of the counter 8, the pulses corresponding to the beat are fed via the delay member 20 to the resetting input of the counter and to the input gate of the storage unit 9 with indicator. The numerical value stored immediately prior to resetting and then continuously indicated represents the distance E.

From the distance E, the velocity v is then obtained by means of the relationship $$F_1 = \frac{f}{a} \cdot \frac{v}{E}$$

by counting the signal oscillations of the frequency $F_1$ over a time period of ($aE/f$) seconds. For this purpose, a signal of a constant frequency of ($f/a$) Hz (Hertz; c.p.s.) is produced by means of the timing oscillator 14. In order to multiply the cycle duration ($a/f$) with E, such a number of signal cycles of the timing signal is counted in the comparison stage 11, as indicated by the numerical value of the distance E stored in the storage unit 9. Once this value has been attained, a stop pulse appears at the output of the counting stage 11. Finally, the number of the signal oscillations of the frequency $F_1$ from the correlator system 2 over the time interval between two successive stop signals of the counting stage 11 is counted in counter 12 and then indicated by the indicator of storage unit 13 as the velocity $v$. The unit of this velocity indication then would be "base lengths per second." In order to provide an indication in different units, e.g. $m./s.$ or $km./h.$, it is possible to change the timing frequency of the oscillator 14 by a conversion factor.

Figure 5:
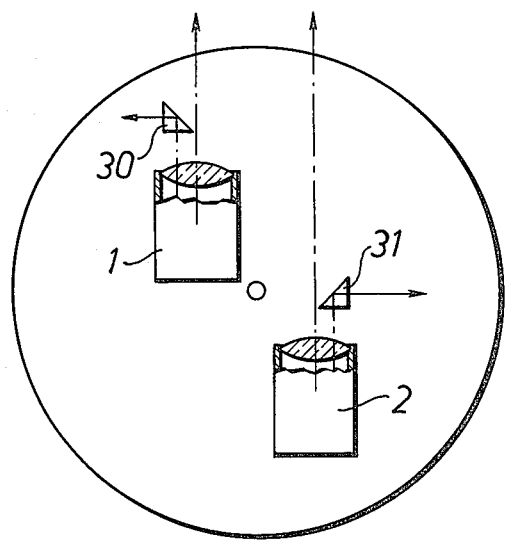
FIG. 5 shows in a schematic plan view, a detail of the apparatus of FIG. 3 comprising the auxiliary correlator systems connected to partial apertures of the correlator systems by way of 45° reflecting prisms.

It has been suggested to produce rotary field signals by splitting a correlator signal with the aid of additional structural components, and deriving the direction of the velocity from these rotary field signals. Such an apparatus as shown in FIG. 5 is employed herein additionally for the indication of a plus sign or a minus sign.

The indication of the correlator measuring head is falsified if the latter is subject to self-rotation, simulating a false angular velocity of the measuring object. In case there exists, for example, in airplanes, an independent measuring possibility for rotation (gyroscope), the invention provides that the corresponding angular velocity is converted into a proportional frequency, and the latter is subtracted with the correct arithmetic sign by heterodyning from the frequencies $F_1$ and $F_2$ before these signals are processed in counters 8 and 12. The difference frequency $\Delta F$ is not affected by such rotations.

The smoothing stage 6 can be a simple RC member, if the measurement is to be conducted only in a limited frequency range of $F_1$ and $F_2$, respectively. In case $F_1$ or $F_2$ varies over several powers of ten, the beat maxima or passages through zero are determined by AND gates according to the present invention.

A device having such an AND gate 15 is illustrated in FIG. 2. The two inputs of the AND gate 15 are connected with the outputs of the saturated amplifiers 3,4, associated with the correlator systems 1, 2. Respectively one flip-flop 16, 17 is connected after the amplifier 3 and the AND gate 15. The outputs of the flip-flops are connected with the forward counting input and the backward counting input, respectively, of a two-bit counter 18. This counter then drives the one-shot multivibrator 7 (FIG. 1).

The AND gate 15 operates in the cycle of the rectangular signals of the amplifiers 3, 4 and is inoperative for longer than a cycle only if the input signals thereof are in phase opposition. Accordingly, the counter 18 counts alternatingly forwards and backwards with 0, 1, 0, 1. . . . . When the gate 15 is inoperative, the two-bit counter indicates 2. This triggers the setting pulse for the one-shot multivibrator 7 which then yields the corresponding pulse of the difference frequency signal.

Devices for range finding in accordance with the present invention can also be employed, in particular, for aiding blind persons. The distance with respect to a stationary object is determined by quite irregular moving (wagging) the measuring head with the staggered, rigidly joined correlators by hand, in order to produce relative transverse velocities. Here again, rotation of the measuring head by the blind person, superimposed on the transverse movement, ensue in angular velocities falsifying the measuring result.

As illustrated in FIG. 3, these angular velocity components are measured by two additional auxiliary correlators 23, 24 oriented in mutual opposition and at right angles to the measuring correlators 1, 2. It can be seen from the figure that the angular velocity is common to all four correlators, while the transverse motion component to be measured is zero as regards the systems 23, 24.

The signal frequencies produced by the transverse motion by means of the systems 1, 2 are either larger or smaller than those corresponding to the correct measuring value, due to the common angular velocity. They can now be corrected by the signal frequency supplied by the auxiliary system 23 or 24. Actually, one of these systems would be sufficient for this purpose. However, the dual measurement ensures that a moving object in the field of one of these auxiliary systems 23, 24 does not, in turn falsify the measurement again, for only if both systems deliver the same frequency, this value is employed for correction purposes according to the present invention.

The arithmetic sign of the correction can be determined by means of direction-sensitive auxiliary systems 23, 24. During normal use of the measuring head, however, the angular velocity and the transverse velocity is effective in the same sense of direction (the contrary can only be realized upon a conscious "counter movement." Therefore, in a simplified variation of the apparatus of the present invention, it is possible to obtain satisfying measuring results with simple, direction-independent correlator systems, shown in FIG. 5, wherein the auxiliary correlator systems 23, 24 are replaced by reflecting prisms 30, 31 connected to partial apertures of the correlator systems, 1, 2 and deflecting rectangularly the optical axis of the partial apertures, if the frequencies of the auxiliary signals are always subtracted from the frequencies of the measuring signals.

We claim:

1. An apparatus for measuring the distance and velocity of an object relative to a reference system, comprising:
   a. an object;
   b. two optical correlator systems each of which has a different distance from said object and an optical axis thereon, said correlator systems generating electrical output signals having a given frequency;
   c. means connected to said electrical output signals for mixing said electrical output signals and generating an auxiliary signal having a given auxiliary frequency comprising the difference in frequency of said electrical output signals; and
   d. means for counting the number of signal cycles of one of said electrical output signals during the period of time necessary for one cycle of said auxiliary frequency, and indicating the number of signal cycles as a value proportional to the distance.

2. The apparatus of claim 1 further comprising means for generating a second auxiliary signal having a constant timing frequency dependent on the optical characteristic values of said correlator systems; means for generating a third auxiliary signal from said second auxiliary signal after a given number of cycles as indicated by said means for indicating; and second means for counting and indicating the number of the signal cycles of one of said electrical output signals during the period of time necessary for said third auxiliary signal as a value proportional to the velocity.

3. The apparatus of claim 1, further comprising, for the elimination of measuring errors due to self-rotation of the optical correlator systems relative to the reference system, means for determining the angular velocity of self-rotation comprising two auxiliary correlator systems (23, 24) oriented at right angles to the optical axes of said optical correlator systems (1,2) and in mutually opposed relationship generating correcting signals for correcting the frequency of said electrical output.

4. The apparatus of claim 3, further comprising means for determining said velocity with the correct arithmetic sign, and correcting the frequency of said electrical output signals.

5. The apparatus of claim 1, wherein said optical correlator systems (1, 2) have photoelectric receivers which are connected, via saturated amplifiers (3, 4), to a mixing stage (5); a one-shot multivibrator (7) is connected after said mixing stage via a smoothing stage (6); a distance indicating device coupled with a storage unit (9) having an input gate is connected to one of said amplifiers (3) via a counting stage (8) having a resetting input, wherein said one-shot multivibrator (7) is connected to said input gate of said storage unit (9) and, via a delay member (20), with said resetting input of said counting stage (8).

6. The apparatus of claim 5, wherein said mixing stage (5) comprises a resistor network.

7. The apparatus of claim 5, further comprising a comparison stage (11) having a counter controlled by an oscillator (14) having a constant timing frequency; a second storage unit (13) having an input gate coupled with an indicator for the velocity indication connected after one of said amplifiers (3) via a second counting stage (12), wherein said comparison stage (11) is connected to said input gate of said second storage unit (13) and, via a delay member (21), to said resetting input of said second counting stage (12).

8. The apparatus of claim 5, wherein the outputs of said saturated amplifiers (3, 4) are connected to the inputs of an AND gate (15); a first flip-flop (16) is connected after this gate, and a second flip-flop (17) is connected after one of the amplifiers (3); the outputs of these flip-flops are connected to the forward counting input and the backward counting input, respectively, of a two-bit counter (18); the output of this counter is connected with the input of said one-shot multivibrator (7), the output signals of which comprise control signals for said counter (8) and said storage unit (9), and as resetting signals for said two-bit counter (18).

9. The apparatus of claim 3, further comprising an electric logic circuit for actuating the measuring device only if the signals of the auxiliary correlator systems have the same frequency.

10. The apparatus of claim 3, further comprising 45° reflectors connected to partial apertures of said correlator systems (1, 2) thus replacing said auxiliary correlator systems (23, 24).

11. The apparatus of claim 3, further comprising means for determining said velocity without regard to the arithmetic sign and reducing the frequency of said electrical output signals in dependence on said velocity.

12. The apparatus of claim 10, wherein said reflectors are reflecting prisms.

* * * * *